United States Patent [19]

Krauss et al.

[11] 4,355,790
[45] Oct. 26, 1982

[54] HEAT-TREATMENT DEVICE FOR PROLONGING THE LIFE OF A PRESSURE VESSEL SUCH AS A REACTOR PRESSURE VESSEL ESPECIALLY

[75] Inventors: Peter Krauss, Erlangen; Ewald Müller, Neunkirchen; Horst Pörner, Erlangen; Robert Weber, Uttenreuth, all of Fed. Rep. of Germany

[73] Assignee: Kraftwerk Union Aktiengesellschaft, Mülheim (Ruhr), Fed. Rep. of Germany

[21] Appl. No.: 97,977

[22] Filed: Nov. 28, 1979

[30] Foreign Application Priority Data

Nov. 30, 1978 [DE] Fed. Rep. of Germany ....... 2851925

[51] Int. Cl.³ ............................................. C21D 9/00
[52] U.S. Cl. ................................. 266/252; 266/255; 266/258
[58] Field of Search ............... 266/261, 249, 251, 252, 266/255, 256, 258

[56] References Cited

FOREIGN PATENT DOCUMENTS

2322118 11/1973 Fed. Rep. of Germany .

*Primary Examiner*—R. Dean
*Attorney, Agent, or Firm*—Herbert L. Lerner; Laurence A. Greenberg

[57] ABSTRACT

Heat-treating device for prolonging the life of a pressure vessel formed of thermally resistant material subject to time-dependent structural changes due to neutron fluence includes a heating device positionable within a pressure vessel adjacent to a wall portion thereof which is to be heat-treated; a mounting support for the heating device including a substantially cylindrical, heat-insulating holding member insertable into and removable from the pressure vessel through an opening in the pressure vessel; supply lines for an energy carrier supplying the heat; insulating means for keeping the heat away from heat-sensitive parts of the pressure vessel which are not to be heat-treated and for reducing heat losses during the heat treatment; a hollow substantially cylindrical thermal shield disposed in the pressure vessel and, with the inner peripheral surface of the pressure vessel, defining an annular gap; and a reactor chamber wherein at least part of the pressure vessel is located, the reactor chamber being otherwise empty during the heat treatment and having ceiling slabs disposed thereon for shielding the reactor chamber from the outside, the holding member being receivable in the pressure vessel in a location whereat it defines, with the inner peripheral surface of the thermal shield, a convection space communicating at upper and lower ends thereof with the annular gap, the heating device comprising a heating source and being secured to the holding member so that, with the heating device received in the pressure vessel, a flow of heating gas is traversible from the heating source through the convection space to an upper deflection space and, from the latter, downwardly through the annular gap to a lower deflection space and, from the latter, back to the heating source, in a closed circuit.

6 Claims, 5 Drawing Figures

HEAT-TREATMENT DEVICE FOR PROLONGING THE LIFE OF A PRESSURE VESSEL SUCH AS A REACTOR PRESSURE VESSEL ESPECIALLY

The invention relates to a heat-treating device for prolonging the life of a pressure vessel, such as a reactor pressure vessel, especially and, more particularly, of such a pressure vessel formed of thermally resistant material subject to time-dependent structural changes due to neutron fluence, the heat-treating device including an heating device positionable within a pressure vessel adjacent to a wall portion thereof which is to be heat-treated, a mounting support for the heating device including a substantially cylindrical, heat-insulating holding member insertable into and removable from the pressure vessel through an opening in the pressure vessel, supply lines for an energy carrier supplying the heat; insulating means for keeping the heat away from heat-sensitive parts of the pressure vessel which are not to be heat-treated and for reducing heat losses during the heat treatment, and a hollow substantially cylindrical thermal shield disposed in the pressure vessel and, with the inner peripheral surface of the pressure vessel, defining an annular gap.

Such a device has become known heretofore from German Published Non-Prosecuted Application DE-OS 2 322 118 wherein the holding member has a closure cover, with which the pressure vessel opening is sealed after the heating device is inserted, so that the pressure vessel can be subjected to a heat treatment after it is drained of water although the reactor room or chamber is flooded. If the cover seal which is especially constructed as an inflatable sealing ring should fail, a water break-in from the reactor room into the interior of the pressure vessel can occur, which can cause even greater embrittlement than that which existed prior to the heat treatment and which was exactly what was to have been removed by the heat treatment. The pressure vessel wall to be treated is furthermore heated by radiation emanating from resistance heaters of the heating device. In reactor pressure vessels of older type of construction, which also have so-called thermal shield, an effective heat treatment is not possible with such a heating device, since the thermal shield screens or shields the pressure vessel wall. However, it is in just such older reactor pressure vessels that a necessity exists for subjecting them to a heat treatment since, due to the long-term operation thereof, they should shortly reach the maximal life thereof without a temperature treatment. It can further be stated that in the heretofore known device, parts which are firmly connected to the reactor pressure vessel, such as the secondary core support in the vicinity of the spherical bottom of the pressure vessel, cannot be protected effectively against being heated up by heat flux. Temperature protection is especially indicated in the case of the secondary core support because it is generally made of a material different from the pressure vessel and, therefore, has a coefficient of thermal expansion different therefrom. Thus, the pressure vessel is formed of an alloyed carbon steel with austenitic inner plating, but the secondary core support is formed of an austenitic material.

It is an object of the invention to provide a heat-treating device of the foregoing type which avoids the aforementioned difficulties of heretofore known devices of this general type and which, more specifically, affords effective heat treatment of reactor pressure vessels with a thermal shield and avoids water break-in during the heat treatment. A secondary object is to provide such a device which protects the spherical bottom region of the reactor pressure vessel and, in particular, the parts firmly built-in there, such as the secondary core support, against an unduly high temperature rise during the heat treatment and which affords temperature control through the removal of excess heat to the outside.

Further advantages attainable with the invention are that a water break-in during the heat treatment is impossible and that, thereby, a possibility exists of opening the holding member for the purpose of temperature control and removal of excess heat; that the heat, although gas heating is used, may be generated in situ and thereby, the losses in the transport of heating gas through feed lines and discharge lines and the increased cost of lines resulting therefrom, are avoided.

With the foregoing and other objects in view, there is provided, in accordance with the invention, a heat-treating device for prolonging the life of a pressure vessel formed of thermally resistant material subject to time-dependent structural changes due to neutron fluence comprising an heating device positionable within a pressure vessel adjacent to a wall portion thereof which is to be heat-treated; a mounting support for the heating device including a substantially cylindrical, heat-insulating holding member insertable into and removable from the pressure vessel through an opening in the pressure vessel; supply lines for an energy carrier supplying the heat; insulating means for keeping the heat away from heat-sensitive parts of the pressure vessel which are not to be heat-treated and for reducing heat losses during the heat treatment; a hollow substantially cylindrical thermal shield disposed in the pressure vessel and, with the inner peripheral surface of the pressure vessel, defining an annular gap; and a reactor chamber wherein at least part of the pressure vessel is located, the reactor chamber being otherwise empty during the heat treatment and having ceiling slabs disposed thereon for shielding the reactor chamber from the outside, the holding member being receivable in the pressure vessel in a location whereat it defines, with the inner peripheral surface of the thermal shield, a convection space communicating at upper and lower ends thereof with the annular gap, the heating device comprising a heating source and being secured to the holding member so that, with the heating device received in the pressure vessel, a flow of heating gas is traversible from the heating source through the convection space to an upper deflection space and, from the latter, downwardly through the annular gap to a lower deflection space and, from the latter, back to the heating source in a closed circuit.

In accordance with another feature of the invention, the pressure vessel is formed with an annular shoulder at the opening thereof and has a spherical bottom, and the holding member is formed as a hollow member having a first annular flange at an upper end thereof and a second annular flange at a lower end thereof, the annular flanges being sealingly engageable, respectively, with the annular shoulder and the inner peripheral surface of the spherical bottom.

In accordance with a further feature of the invention, the device includes a plurality of convection shafts formed by a plurality of prismatic hollow conduction members distributed about the outer periphery of the holding member and extending parallel to the axis of the pressure vessel.

In accordance with an added feature of the invention, the hollow conduction members have an upper channel region, rotary blower means are disposed in the upper channel region for amplifying convection flow therethrough, the blower means having respective motors located outside the convection space on an upper end wall of the holding member, the blower means having respective shafts extending through the respective first annular flanges at the upper end of the holding member.

In accordance with an additional feature of the invention, the insulating means comprise a protective cylinder coaxial to the holding member and surrounding the thermal shield for shielding the latter against direct heat radiation emanating from the heating device.

In accordance with yet another feature of the invention, the substantially cylindrical holding member is formed with an annular wall defining therewithin an heat storage space separated thereby from the convection space, and including cover means for closing and for opening to a varying extent the heat storage space.

In accordance with an alternate embodiment of the invention, there is provided an heat-treating device for prolonging the life of a pressure vessel formed of thermally resistant material subject to time-dependent structural changes due to neutron fluence comprising an heating device positionable within a pressure vessel adjacent to a wall portion thereof which is to be heat-treated; a mounting support for the heating device including a substantially cylindrical, heat-insulating holding member insertable into and removable from the pressure vessel through an opening in the pressure vessel; supply lines for an energy carrier supplying the heat; insulating means for keeping the heat away from heat-sensitive parts of the pressure vessel which are not to be heat-treated and for reducing heat losses during the heat treatment; a hollow substantially cylindrical thermal shield disposed in the pressure vessel and, with the inner peripheral surface of the pressure vessel, defining an annular gap; and a reactor chamber wherein at least part of the pressure vessel is located, the reactor chamber being otherwise empty during the heat treatment and having ceiling slabs disposed thereon for shielding the reactor chamber from the outside, the holding member being receivable in the pressure vessel in a location whereat it defines, with the inner peripheral surface of the thermal shield, a convection space, means comprising suction and pressure pipes and cooperating blowers for providing communication between the convection space and the annular gap, in a closed circuit for a flow of heating gas, the heating gas being traversible through the closed circuit from a heating source of the heating device introduced into the closed circuit and over which the heating gas is passed before flowing through the annular gap.

In accordance with yet a further feature of the invention, the suction and pressure pipes project beyond and above a location of the reactor chamber at which a maximal level of water is received in the reactor chamber, and the respective blowers are mounted at the upper ends of the suction and pressure pipes projecting beyond and above the maximal water-level location.

In accordance with a concomitant feature of the invention, the heating source is located above the maximal water-level location and within a part of the respective pressure pipes post-connection to the respective blowers.

Other features which are considered as characteristic for the invention are set forth in the appended claims.

Although the invention is illustrated and described herein as embodied in heat-treatment device for prolonging the durability of lifespan of a pressure vessel, such as a reactor pressure vessel, especially, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description when read in connection with the accompanying drawings, in which.

Referring now to the drawing and first, particularly, to FIG. 1 thereof, there is shown a nuclear reactor pressure vessel 1 (hereinafter referred to simply as pressure vessel, for short) which is formed of heat-resistant alloy steel, of which, in particular the wall portions 1a marked by stippling are exposed during operation to neutron radiation emanating from the reactor core and are, therefore, subjected with increasing life to a change in the structure leading toward an embrittlement of the material. This can result in the necessity of removing the pressure vessel 1, for example, after 20 years operation, and replacing it with a new one. However, the lifespan of the presssure vessel 1 can be prolonged by a heat treatment based upon recovery tempering with the hereinafter-described device according to the invention. The heat-treating device of the invention identified as a whole by WV is formed of a heating device 2, which can be brought into position within the inner space 1b of the pressure vessel 1 close to the wall portions 1a of the pressure vessel 1 which are to be treated. To this end, as is apparent from FIG. 1, the internals are removed from the pressure vessel 1 except for a stool-like secondary core support 1c located in the region of the spherical bottom 1d thereof. A beefed-up vessel flange 1f, to which a non-illustrated pressure vessel 1 cover is normally clamped in a tightly sealed manner by non-illustrated flange screws, encircles the vessel opening 1e. The pressure vessel 1 is of substantially hollow-cylindrical, cup-like shape. Although only one main reactor coolant pipe 1g of the pressure vessel 1 is shown in FIG. 1, three input and three output pipes are to be visualized as being uniformly distributed over the circumference of the pressure vessel 1 in the plane of the coolant pipe or line 1g, which is normal to the pressure vessel axis a.

The holding equipment for the heating device 2 is formed of a substantially hollow-cylindrical thermally-insulating holding member 3 which is made up of a tubular middle section 3a and an upper part 3b and a lower part 3c, the diameters of the upper and lower parts 3b and 3c being larger than that of the middle section 3a. The similarly hollow-cylindrical upper part 3b of the holding member 3 is connected to the middle section 3a of the latter by an end wall 3b1, and the outside diameter of the upper part 3b is slightly smaller than the inner diameter a1 of the pressure vessel opening 1e. In the inserted position of the holding member 3 illustrated in FIG. 1, the holding member 3 rests with a ring flange 3b2 of the upper part 3b thereof tightly on the upper side of a ring shoulder 1/1 formed on the inner periphery of the pressure vessel 1. The lower part 3d of the holding member 3 has a ring wall 3c1, with which the holding member 3, in the illustrated inserted condition, rests tightly against the inner peripheral surface of the spherical bottom 1d, and the lower part 3c further has an end wall 3c2 which extends normally to the axis a and forms a connection between the tubular middle section 3a and the ring wall 3c1 and, furthermore, forms a mounting surface for the heating device 2. The latter is made up of individual annular resistance heaters 2a which are fastened to the ring wall 3c2 by supports 2b and are connected by electric leads 4 to a non-illustrated external power source. The electric leads 4 extends through the lower end of the middle section 3a of the holding member 3 in the form of a cable 4a having a protective thermal jacket, are passed along the inner periphery of the middle section 3a to the upper part 3b and continued along the inner periphery of the latter, and are then brought to the outside through a reactor room 5 and ceiling slabs 8 i.e. through a suitably sealed feedthrough opening or passageway 5a thereof. The walls of the biological shield 6, indicated diagrammatically and only in part, merge above the pressure vessel 1 into the concrete structure of the reactor room walls 7, on which the ceiling slabs 8 rest.

The heat treatment of the pressure vessel wall 1a is effected with the reactor rooms 5 drained of water and shielded from the outside by the ceiling slabs 8, and correspondingly also with the interior 1b of the pressure vessel 1 drained of water. The draining is accomplished by means of a non-illustrated conventional immersion pump which can be lowered into the interior of the pressure vessel 1 down to the spherical bottom 1d. After the interior 1b of the pressure vessel 1 is cleared out and drained, the holding member 3 is likewise lowered into the pressure vessel 1 until it is sealingly supported by the ring wall 3c1 thereof on the spherical bottom 1d and by the ring flange 3b2 thereof on the ring shoulder 1/1. The pressure vessel 1 illustrated in FIG. 1 is of an older design with a thermal shield 9 which is of somewhat hollow-cylindrical shape and, during operation of the reactor, shields the pressure vessel wall 1a thermally from the reactor core and from part of the neutron radiation. The thermal shield 9 is supported at the lower end thereof on a bracket 10 fastened to the inner periphery of the pressure vessel 1.

Figure 1:
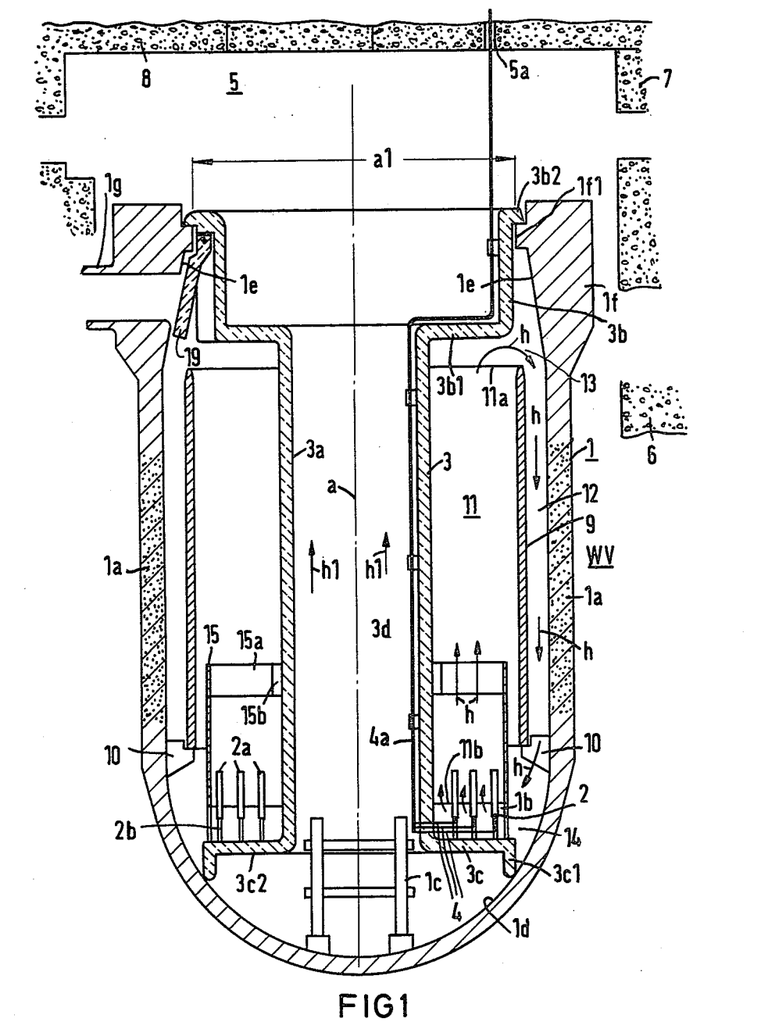
FIG. 1 is a longitudinal sectional view of a first embodiment of the heat-treating device according to the invention having a substantially hollow-cylindrical holding member which is shown in heating position thereof within a reaction pressure vessel.

As is apparent from FIG. 1, the holding member 3 is inserted into the interior 1b of the pressure vessel 1 in such a manner that a convection space 11 is formed between the holding member 3 and the inner peripheral surface of the thermal shield 9. This convection space 11 is in communication at the upper end 11a thereof and at the lower end 11b thereof with an annular gap 12 located between the pressure vessel wall 1a and the thermal shield 9. The heating device 2 is fastened to the lower end i.e. to the lower part 3c, of the holding member 3 in such a member that, in the operating position of the heating device 2 illustrated in FIG. 1 and with the resistance heaters 2a switched on, a flow of heating gas can be conducted, starting from the heating elements 2a, upwardly through the convection space 11 to an upper deflection space 13, from there downwardly through the outer ring space 12 to a lower deflection space 14 and from there back to the heating elements 2a, in a closed circuit. The flow travel of the heating as is indicated by the arrows h.

As is evident, the holding member 3 is constructed as a hollow body; it is formed of temperature-resistant insulating material, for example, of metal insulation from which water can run off, because during installation of the holding member 3, immersion in water can occur before the pressure vessel 1 is pumped out completely. Suitable selection of the heat transmission coefficient for the metal insulation can ensure that excess heat will flow upwardly out of the central wall or shaft 3d in accordance with the arrows h1. In the lower portion of the middle section 3a of the holding member 3, a protective cylinder 15 is disposed which surrounds the heating device 2 and shields the thermal shield 9 from direct heat radiation emanating from the heating device 2. The protective cylinder 15 is fastened to the holding member 3 by means of stellate mounting arms 15a and a holding ring 15b fastened to the outer periphery of the middle section 3a of the holding member 3. Since the protective cylinder 15 is supposed to shield against direct heat radiation, it is advantageous to make it of steel with a reflecting layer applied to the inner peripheral surface thereof.

Figure 2:
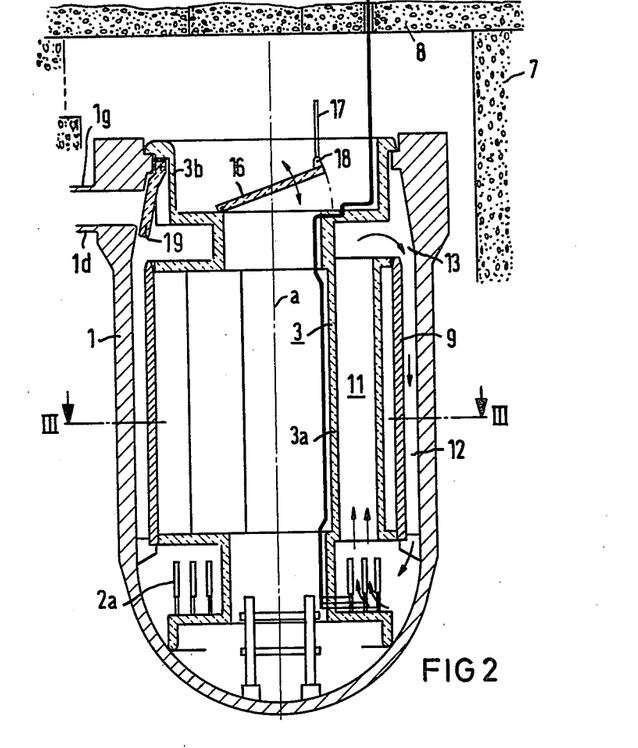
FIG. 2 is a view of FIG. 1 reduced in scale and showing another embodiment of the holding member wherein convection spaces are formed by several hollow-conducting members distributed at the other peripheral thereof, the sectional view of FIG. 2 being taken along the lines II—II in FIG. 3.
Figure 3:
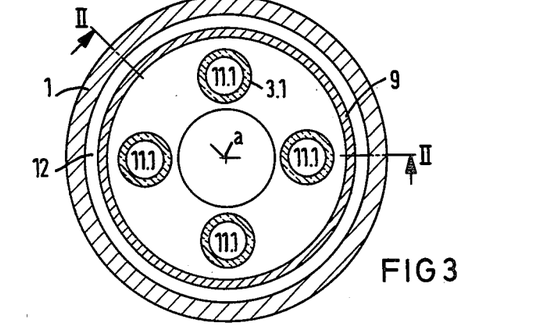
FIG. 3 is a cross-sectional view of FIG. 2 taken along the line III—III in direction of the arrows.

In the embodiment of the invention according to FIGS. 2 and 3, wherein like features are identified by the same reference characters as in FIG. 1, several convection shafts 11.1 are formed by several prismatic hollow conduction member 3.1 which are distributed about the outer peripheral surface of the holding member 3 and are disposed with the axes thereof parallel to the axis a of the pressure vessel 1. These hollow conduction members 3.1 surround the tubular middle section 3a of the holding member 3 like satellites. They are of tubular space. Since, in this case, the resistance elements of the heating device 2 are disposed only beneath the openings of the hollow conduction members 3.1, a protective cylinder 15 is unnecessary. The advantage of this construction lies essentially in that an amplified chimney effect is obtained by the convection shafts 11.1. The flows of heating gas out of the individual convection shafts 11.1 are then distributed over the entire circumference of the space 12 into the deflection spaces 13. The central heat storage space 3d of the holding member 3, which is separated by the ring wall of the holding member middle section 3a from the rest of the reactor interior 1b and also from the convection shafts 11.1, can be closed off and opened to a greater or lesser extent in the embodiment of FIGS. 2 and 3 by a cover 16, as is evident by the illustrated position thereof. The cover 16 can be brought into any desired position by remote control in the manner of a flap or shutter by a linkage which is indicated diagrammatically at 17 and is linked to the cover 16 at 18. This flap control permits the removal of excess heat from the central heater space 3d in such a manner that the temperature of the thermal shield 9 can also be reduced therewith during the heating-up process. Also provided is a sealing flap 19 which is hinged to the upper part 3b of the holding member 3 (see also FIG. 1), and by which the reactor coolant lines 1d can be closed off so that no heating gas can flow through them.

Figure 4:
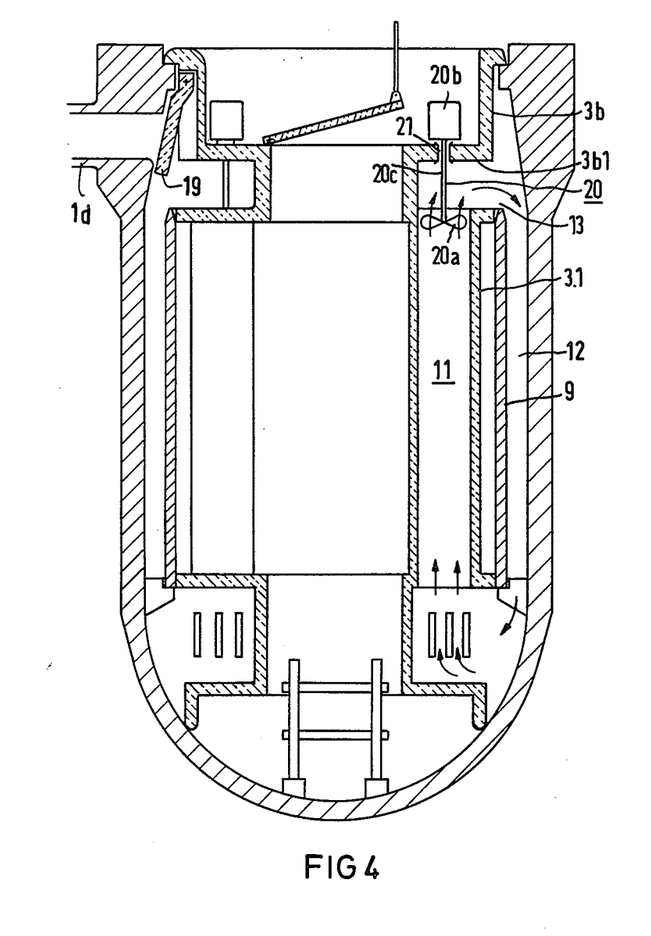
FIG. 4 is another view like that of FIG. 1 of a third embodiment of the invention having blowers associated with the hollow conducting members for intensifying or amplifying the convection heating flow.

A third embodiment of the invention according to FIG. 4 differs from the embodiment shown in FIGS. 2 and 3 in that in the upper channel region of the hollow conduction members 3.1, impellers 20a of rotary blowers 20 are disposed to provide aid or assistance to the convection flow. The motors 20b of the blowers 20 are fastened to the end wall 3b1 of the upper part 3b of the holding member 3, outside the convection shafts 11.1 and outside the upper deflection space 13, the blower shafts 20c protruding through the end wall 3c1 by means of suitably sealed feedthrough openings or passageways 21. These fans or blowers 20 even amplify or strengthen the chimney effect within the convection shafts 11.1 further, whereby the heating gas coming from the heating device 2 can be fed without excessive temperature drop i.e. along the fastest path, to the pressure vessel wall portions which are to be heated.

Figure 5:
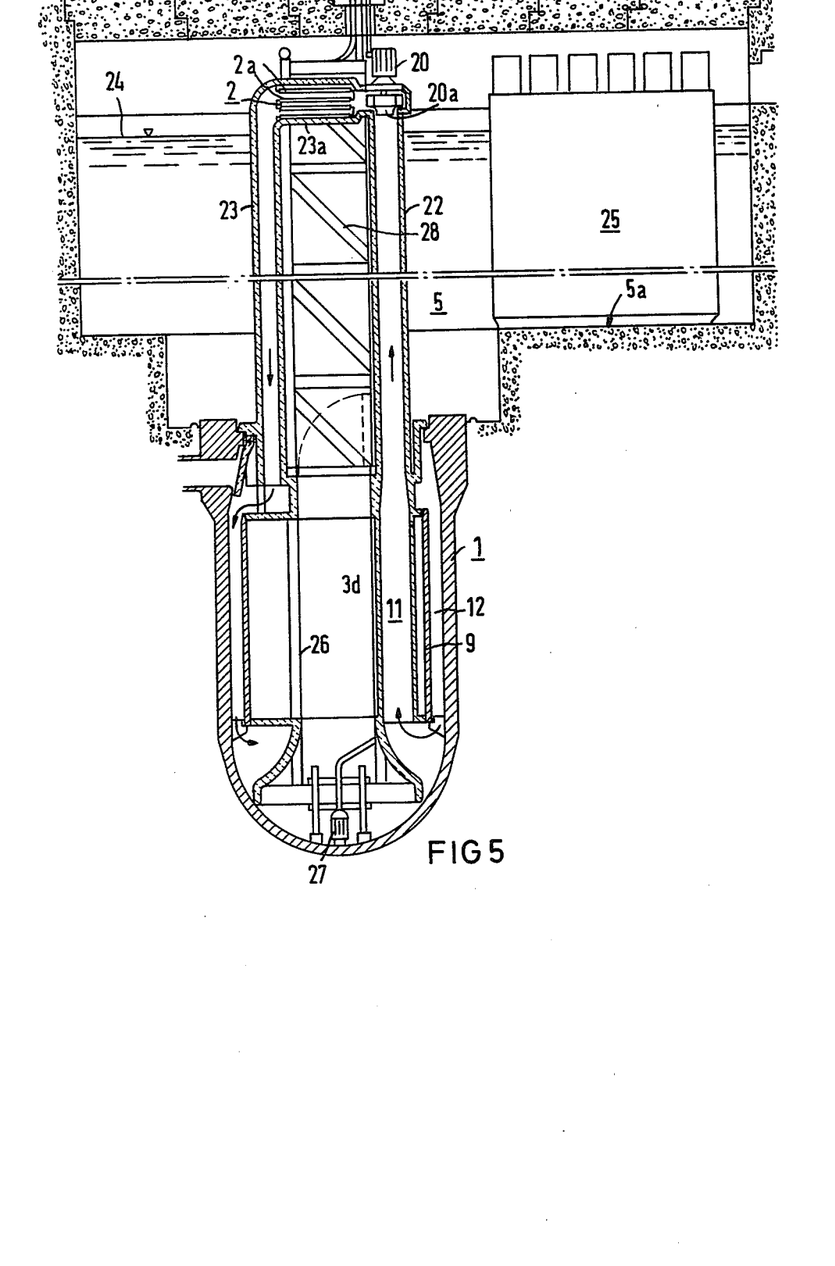
FIG. 5 is another view of FIG. 1 reduced in scale and showing a fourth embodiment of the invention having suction and pressure pipes for blowers extended upwardly beyond the water level of the reactor cavity.

FIG. 5 shows a fourth embodiment of the device according to the invention, in which suction or exhaust pipes 22 and pressure or delivery pipes 23 of the blower 20, which serve for circulating the heating gas, are extended upwardly beyond the water level 24 of the reactor pit 5. The blower 20 is accordingly mounted at the upper pipe ends 22a and 23a protruding upwardly beyond the water level 24. This has the advantage that the device according to the invention, with the holding member 3 thereof, can be brought into position even if the reactor pit 5 remains filled with water, and the water can then be pumped out of the reactor pit 5 and the pressure vessel 1 afterwards. Pressure vessel internals 25 can be disposed on a storage or placement surface 5a of the reactor pit 5 before the device according to the invention is positioned. The heating elements 2a of the heating device 2 are disposed within a pressure pipe part 23a post-connected to the blower 20. The fan wheel or impeller 20a of the blower 20 is therefore not subjected to fresh, but rather to cooled-down heating gas. A cooling-air pipe 26 extending down into the lower portion of the interior space 3d serves to control the temperature. Also, in FIG. 5, an immersion pump 27 with associated flexible suction line and a support mast 28 serving for positioning and transporting the holding member 3, is shown. With this mast 28, sealing elements disposed between the holding member 3 and the pressure vessel 1 and otherwise not shown in detail, can be brought by axial and/or radial displacement into position relative to the vessel wall and to the inner wall surface of the thermal shield 9 in such a manner that heat losses can be kept low. The axial and radial displacement can be effected by remote control in a conventional manner.

If the heat treatment relates to a reactor pressure vessel which has no separate thermal shield 9 (the function of the thermal shield is then assumed, during operation of the reactor, by the so-called core barrel), then a suitable thermal shield would be inserted together with the holding means 3 for the purpose of carrying out the heat treament, so that the annular gap 12, which is required for the heat treatment by heating gas and which is defined in this case by the outer peripheral surface of the thermal shield 9 and the cylindrical inner peripheral surface of the pressure vessel 1, is formed. It should further be noted that the walls of the holding member 3, as mentioned hereinbefore, are formed, preferably of all-metal insulation; the segments of these walls being first reduced to a smaller diameter, so that the device WV of the invention can be inserted through the vessel opening 1e. This is not shown in detail in the figures, since it is already described and claimed in the co-pending preceding U.S. application Ser. No. 037,121, filed May 8, 1979 of the same co-inventors.

There is claimed:

1. Heat-treating device for prolonging the life of a pressure vessel formed of thermally resistant material subject to time-dependent structural changes due to neutron fluence comprising an heating device positionable within a pressure vessel adjacent to a wall portion thereof which is to be heat-treated; a mounting support for said heating device including a substantially cylindrical, heat-insulating holding member insertable into and removable from the pressure vessel through an opening in the pressure vessel; supply lines for an energy carrier supplying the heat; insulating means for keeping the heat away from heat-sensitive parts of the pressure vessel which are not to be heat-treated and for reducing heat losses during the heat treatment; a hollow substantially cylindrical thermal shield disposed in the pressure vessel and, with the inner peripheral surface of the pressure vessel, defining an annular gap; and a reactor chamber wherein at least part of the pressure vessel is located, said reactor chamber being otherwise empty during the heat treatment and having ceiling slabs disposed thereon for shielding said reactor chamber from the outside, said holding member being receivable in the pressure vessel in a location whereat it defines, with the inner peripheral surface of said thermal shield, a convection space communicating at upper and lower ends thereof with said annular gap, said heating device comprising a heating source and being secured to said holding member so that, with the heating device received in the pressure vessel, a flow of heating gas is traversible from said heating source through said convection space to an upper deflection space and, from the latter, downwardly through said annular gap to a lower deflection space and, from the latter, back to said heating source, in a closed circuit, the pressure vessel being formed with an annular shoulder at the opening thereof and having a spherical bottom, and said holding member being formed as a hollow member having a first annular flange at an upper end thereof and a second annular flange at a lower end thereof, said annular flanges being sealingly engageable, respectively, with said annular shoulder and the inner peripheral surface of said spherical bottom, a plurality of convection shafts formed by a plurality of prismatic hollow conduction members being distributed about the outer periphery of said holding member and extending parallel to the axis of the pressure vessel.

2. Device according to claim 1 wherein said hollow conduction members have an upper channel region, rotary blower means disposed in said upper channel region for amplifying convection flow therethrough, said blower means having respective motors located outside said convection space on an upper end wall of said holding member, said blower means having respective shafts extending through the respective first annular flanges at the upper end of said holding member.

3. Device according to claim 1 wherein said insulating means comprise a protective cylinder coaxial to said holding member and surrounding said thermal shield for shielding the latter against direct heat radiation emanating from said heating device.

4. Device according to claim 1 wherein said substantially cylindrical holding member is formed with an annular wall defining therewithin an heat storage space separated thereby from said convection space, and including cover means for closing and for opening to a varying extent said heat storage space.

5. Heat-treating device for prolonging the life of a pressure vessel formed of thermally resistant material subject to time-dependent structural changes due to neutron fluence comprising an heating device positionable within a pressure vessel adjacent to a wall portion thereof which is to be heat-treated; a mounting support for said heating device including a substantially cylindrical, heat-insulating holding member insertable into and removable from the pressure vessel through an opening in the pressure vessel; supply lines for an energy carrier supplying the heat; insulating means for keeping the heat away from heat-sensitive parts of the pressure vessel which are not to be heat-treated and for reducing heat losses during the heat treatment; a hollow substantially cylindrical thermal shield disposed in the pressure vessel and, with the inner peripheral surface of the pressure vessel, defining an annular gap; and a reactor chamber wherein at least part of the pressure vessel is located, said reactor chamber being otherwise empty during the heat treatment and having ceiling slabs disposed thereon for shielding said reactor chamber from the outside, said holding member being receivable in the pressure vessel in a location whereat it defines, with the inner peripheral surface of said thermal shield, a convection space, means comprising suction and pressure pipes and cooperating blowers for providing communication between said convection space and said annular gap, in a closed circuit for a flow of heating gas, the heating gas being traversible through said closed circuit from a heating source of said heating device introduced into said closed circuit and over which the heating gas is passed before flowing through said annular gap, said suction and pressure pipes projecting beyond and above a location of said reactor chamber at which a maximal level of water is received in said reactor chamber, and the respective blowers being mounted at the upper ends of said suction and pressure pipes projecting beyond and above said maximal water-level location.

6. Device according to claim 5 wherein said heating source is located above said maximal water-level location and within a part of the respective pressure pipes post-connected to the respective blowers.

* * * * *

UNITED STATES PATENT AND TRADEMARK OFFICE
CERTIFICATE OF CORRECTION

PATENT NO. : 4,355,780

DATED : October 26, 1982

INVENTOR(S) : David G. Bridgnell et al.

Figure 7:
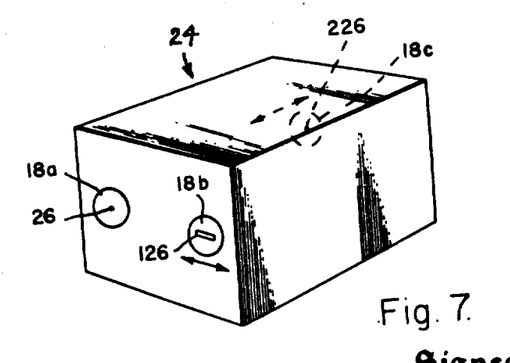

It is certified that error appears in the above-identified patent and that said Letters Patent is hereby corrected as shown below:

FIGURES 1, 2 and 7, should appear as shown on the attached sheets.

UNITED STATES PATENT AND TRADEMARK OFFICE
CERTIFICATE OF CORRECTION

PATENT NO. : 4,355,780

DATED : October 26, 1982

INVENTOR(S) : David G. Bridgnell and Frederick W. Jacobsen

It is certified that error appears in the above-identified patent and that said Letters Patent are hereby corrected as shown below:

Drawing Figure 1 should appear as shown below:

Fig. 1.

UNITED STATES PATENT AND TRADEMARK OFFICE
CERTIFICATE OF CORRECTION

PATENT NO. : 4,355,780

DATED : October 26, 1982

INVENTOR(S) : David G. Bridgnell and Frederick W. Jacobsen

Page 3 of 4

It is certified that error appears in the above-identified patent and that said Letters Patent are hereby corrected as shown below:

Drawing Figure 2 should appear as shown below:

UNITED STATES PATENT AND TRADEMARK OFFICE
CERTIFICATE OF CORRECTION

PATENT NO. : 4,355,780    Page 4 of 4

DATED : October 26, 1982

INVENTOR(S) : David G. Bridgnell and Frederick W. Jacobsen

It is certified that error appears in the above-identified patent and that said Letters Patent is hereby corrected as shown below:

Drawing Figure 7 should appear as shown below:

Fig. 7.

Signed and Sealed this

Fifteenth Day of February 1983

[SEAL]

Attest:

GERALD J. MOSSINGHOFF

Attesting Officer    Commissioner of Patents and Trademarks